April 14, 1936.   E. B. BOUGHTON ET AL   2,037,494
LIQUID PRESSURE BRAKING MEANS FOR VEHICLES
Filed Aug. 9, 1933

INVENTORS
E. B. BOUGHTON
J. RODWAY

ATTY.

Patented Apr. 14, 1936

2,037,494

UNITED STATES PATENT OFFICE 2,037,494

LIQUID PRESSURE BRAKING MEANS FOR VEHICLES

Edward Bishop Boughton and John Rodway, London, England, assignors to Lockheed Hydraulic Brake Company Limited, London, England Application August 9, 1933, Serial No. 684,445
In Great Britain October 7, 1932

4 Claims. (Cl. 188—152)

This invention relates to liquid pressure braking means for vehicles, and in particular to the cylinder and piston arrangements at the actual brakes, which, as a result of pressure in a braking conduit, imparts the necessary movement and pressure to the brake elements.

As is well-known, it is usual to mount such an actuating cylinder and piston upon the usual brake shoe carrying plate at the inner side thereof, so that it is totally or partly enclosed by the brake drum. This location of the cylinder makes it inevitable that the cylinder and any liquid therein shall receive a considerable amount of heat which is generated when the brakes are in use, and, moreover, it is necessary to dismantle the brake in order to obtain access to the actuating cylinder.

The present invention has for an object to provide an improved arrangement of brake actuating cylinder and piston which shall not only render the cylinder very accessible but also ensure that it shall absorb litle or no heat from the brake.

To this end and according to the invention, a brake actuating cylinder and piston unit is mounted upon the brake shoe carrying plate at that side thereof remote from the brake shoes with its axis lying substantially normal to said plate; the piston of said unit being connected operatively with a brake shoe through the medium of means for transmitting a force through substantially a right-angle.

The invention is illustrated in the accompanying drawing, in which.

Figure 1:
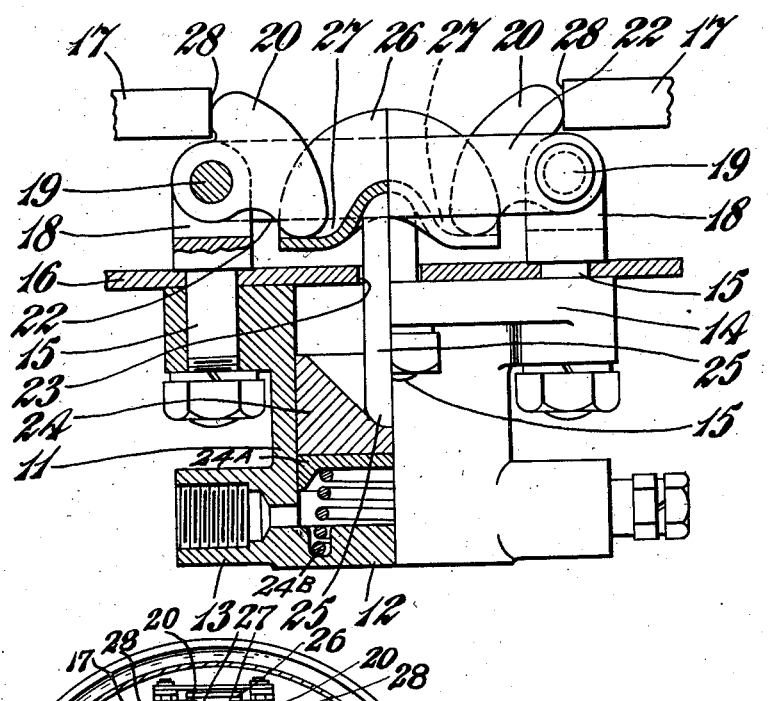
Figure 1 is a broken plan, partly in section, illustrating the liquid pressure means for operating the brakes.
Figure 2:
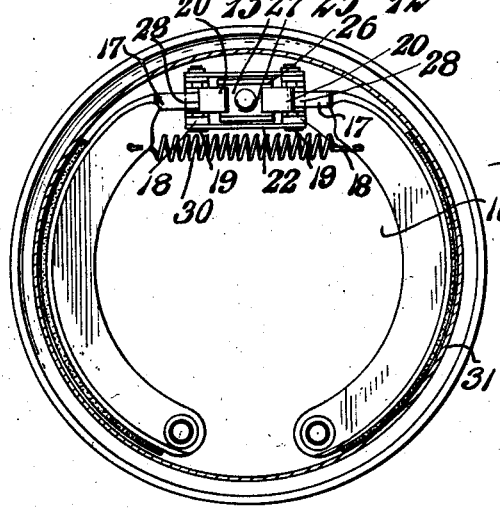
Figure 2 is a view in elevation, partly in section, showing the mounting of the brake shoes and their cooperation with the brake operating means of the invention.

As illustrated in the drawing, the braking means of this invention includes a brake actuating cylinder 11 which is closed at its outer end 12 near which it is provided with an internally threaded bored, boss 13 for connection with a brake conduit (not shown), has a circumferential flange 14 at its inner open end formed with apertures through which bolts 15 are passed to secure the cylinder 11 in position to the outer side of a brake plate 16, i. e., to that side of the latter remote from the brake shoes, parts of which are indicated at 17. Two of the bolts 15 whereby the cylinder 11 is mounted in position have heads in the form of bifurcated lugs 18 which are formed with co-axial apertures through which are passed fulcrum pins 19 carrying each a rocker 20 equivalent to a bell-crank lever. Of the bolts 15, the two in question are so located in position that these rockers 20 may move about their fulcrum pins 19 in a common general plane diametrically of the cylinder 11, the rockers 20 extending from their respective fulcrum pins 19 towards one another, i. e., radially of the axis of the cylinder 11. For purposes of stiffening, corresponding ends of the two fulcrum pins 19 are joined by two struts 22.

The parts are so proportioned that the space between those ends of the rockers 20 which are nearer to the brake plate 16, is equal to substantially two-thirds of the internal diameter of the actuating cylinder 11, and midway between the two bolts 15 which carry the rockers 20 the brake plate 16 is formed with an aperture 23 through which extends, from a piston 24 in said cylinder 11, a short thrust rod 25, the projecting end of which is received, at the inner side of the brake plate 16, in a recess in a compensating bridge member 26, within further oppositely directed recesses 27 in which those ends of the rockers 25 20 nearer the brake plate 16 are received. Each brake shoe 17 is formed at one end with a pressure face 28, located normally substantially level with the centre line of one of the rocker carrying bolts 15, and the rockers 20 are so proportioned that those ends thereof remote from the brake plate 16 are normally in contact with the pressure faces 28 of the brake shoes 17, the action of the usual return spring 30 of which causes said faces 28 to bear upon the rockers 20, the rockers 20 in turn to bear at their other ends upon the compensating bridge member 26, this bridge member 26 in turn to bear upon the corresponding end of the thrust rod 25, and this thrust rod 25 to bear against the piston 24, which latter is thus maintained normally in its off position. The piston 24 has a sealing washer 24A which is maintained at all times in contact with the face of the piston 24 by means of a spring 24B.

When, during the actuating of the brakes, liquid is forced into the actuating cylinder 11, the piston 24 is urged towards the brake plate 16 and thus both rockers 20 are moved about their fulcrum pins 19 away from said plate 16 and in so doing, transmit movement and pressure to the brake shoes 17, each of which latter will thus be urged firmly into contact with the brake drum 31 even though one be more worn than the other; for, if the movement necessary to bring it into contact with the brake drum be greater in the case of one shoe 17 than of the other, the compensating bridge member 26 will simply rock to an extent corresponding to the difference in wear of the respective shoes 17.

It will further be observed that a brake actuating cylinder located according to the invention, is some distance away from the points where heat is generated in the brakes and that, apart from this, it is exposed to a flow of air which could not have access thereto were the cylinder located at the inner face of the brake plate where it will inevitably be enclosed and shielded by the brake drum. With an arrangement according to the present invention, therefore, there is little or no possibility of an undue rise in temperature of the braking liquid.

What we claim is:—

1. A fluid pressure operated brake of the type including a carrying plate and brake shoes on one side of said plate, comprising pressure responsive means carried by the plate on the side opposite the brake shoes, an element projecting through the plate and actuated by said fluid responsive means, rockers pivotally supported in the plate and actuated by said element, said rockers bearing against but wholly free of other connection with the brake shoes, and a compensating member arranged intermediate the element and rockers.

2. A fluid pressure operated brake of the type including a carrying plate and brake shoes, comprising a pressure responsive piston, an element operated by the piston and extending through the carrying plate, rockers pivotally supported on the carrying plate, and a bridge plate for operating the rockers and responsive to operative movement of the element, said bridge plate having a rocking connection with the element.

3. A fluid pressure operated brake of the type including a carrying plate and brake shoes on one side of said plate, a pressure responsive device located on the opposite side of the plate, bolts connecting said device and plate and extending beyond the plate on the brake shoe carrying side thereof, rockers pivotally carried by said bolts, a bridge plate underlying one end of each rocker, the opposite end of each rocker bearing against a brake shoe, and an element actuated by the pressure responsive device and engaging the bridge plate.

4. A fluid pressure operated brake of the type including a carrying plate and brake shoes on one side of said plate, a pressure responsive device located on the opposite side of the plate, bolts connecting said device and plate and extending beyond the plate on the brake shoe carrying side thereof, rockers pivotally carried by said bolts, a bridge plate underlying one end of each rocker, the opposite end of each rocker bearing against a brake shoe, and an element actuated by the pressure responsive device and engaging the bridge plate, said bridge plate being mounted for rocking play with respect to the element.

EDWARD BISHOP BOUGHTON.
JOHN RODWAY.